Aug. 5, 1958 R. B. GRAY 2,846,673

PULSE TRANSFORMER

Filed Oct. 8, 1956

INVENTOR.

Robert B Gray

BY

Ralph Hamman

Attorney 2,846,673
Patented Aug. 5, 1958

2,846,673

PULSE TRANSFORMER

Robert B. Gray, Erie, Pa., assignor to Erie Resistor Corporation, Erie, Pa., a corporation of Pennsylvania Application October 8, 1956, Serial No. 614,571

3 Claims. (Cl. 340—174)

Figures 1, 2, 3:
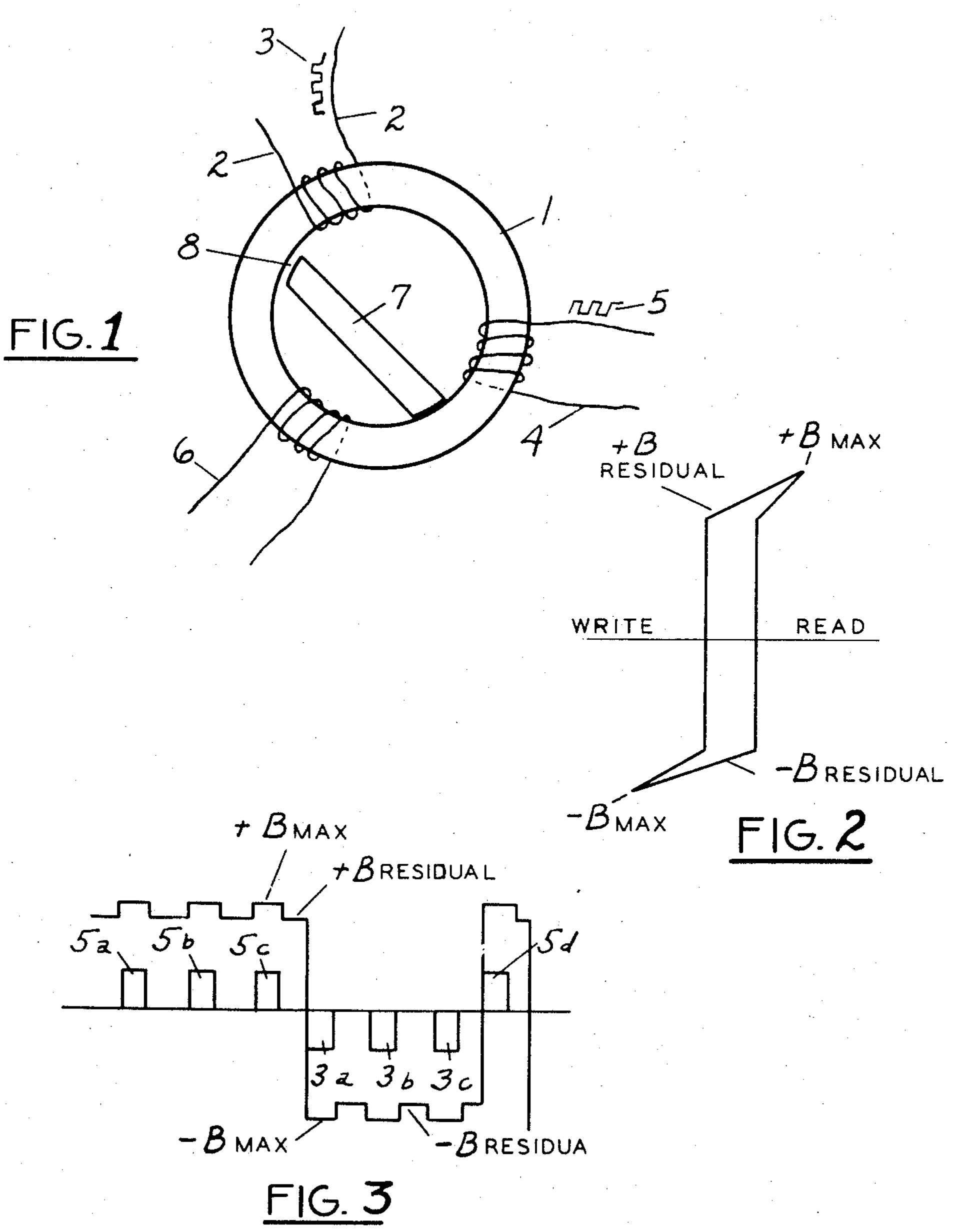

In computers, three winding pulse transformers are used to store or remember information and to deliver the stored information. Information is stored by pulses (usually called "write pulses") fed to one of the windings which magnetize the transformer core to saturation in one direction (e. g., negative) and is delivered by pulses fed to another of the windings (usually called "read pulses") which magnetize the transformer core to saturation in the opposite (e. g., positive) direction. The output which appears in the third winding will be small when a read pulse follows a read pulse and will be larger when a read pulse follows a write pulse. The reason for this difference is that a write pulse magnetizes the core to a flux density of —B max. during the pulse which drops to —B residual after the pulse. The read pulse magnetizes the core to a flux density of +B max. which drops to +B residual after the pulse. When a read pulse follows a read pulse, the residual flux after the first read pulse is +B residual and the change in flux during the following read pulse is from +B residual to +B max. When a read pulse follows a write pulse, the residual flux after the write pulse is —B residual and the change in flux during the following read pulse is from —B residual to +B max. Although it would seem that the output when a read pulse follows a write pulse should be enough larger than the output when a read pulse follows a read pulse, difficulty has been experience in obtaining a sufficient difference in outputs and this invention is intended to overcome that difficulty.

In accordance with the present invention, a magnetic shunt is arranged around the output coil which shunts an appreciable fraction of the flux at saturation flux densities but a negligible amount of flux at non-saturation flux densities. This means that as the total flux change from +B residual to +B max., only part of the change appears in the output coil while as the flux changes from —B residual to +B max. substantially all of the change from —B residual to +B residual appears in the output coil. The shunt, accordingly, greatly reduces the output when a read pulse follows a read pulse but only slightly affects the output when a read pulse follows a write pulse.

In the drawing, Fig. 1 is a diagrammatic view of a transformer; Fig. 2 is a magnetization curve; Fig. 3 is a diagram showing the outputs obtained from various pulse sequences.

In the drawing, 1 indicates a toroidal or ring-shaped magnetic core which may, for example, be one of the low loss magnetic alloys capable of assuming stable remanence conditions such as Permalloy, powdered iron or one of the ferrites. On this core are three windings, a winding 2 which is fed with write pulses 3, a winding 4 which is fed with read pulses 5 and a winding 6 in which the output appears. The write pulses 3 are connected to the winding 2 so as to magnetize the core 1 in the direction to produce a negative output in the output coil 6. The write pulses are of sufficient strength to completely saturate the core 1. The read pulses 5 are connected to the winding 4 in the direction to magnetize the core 1 in a positive direction so far as the output coil 6 is concerned and the read pulses likewise are of sufficient strength to completely saturate the magnetic core. The parts so far described are in use in computers. The toroidal transformer is a memory device which when supplied with a read pulse remembers whether the last preceding pulse was a write pulse or a read pulse. If the pulse preceding a read pulse was another read pulse, the output appearing in the winding 6 is small. On the other hand, if the pulse preceding a read pulse was a write pulse, then the output appearing in the output winding 6 is large. The reason for this appears in the magnetization curve of Fig. 2. During a write pulse, the flux density in the magnetic core 1 reaches a value —B max. and at the end of the write pulse the magnetic flux in the core drops to a residual value —B residual. During a read pulse, the flux in the magnetic core 1 reaches a value +B max. and at the end of the read pulse the flux drops to a value +B residual. Since the magnetic flux densities, +B max. and —B max., are saturation values, they are substantially unaffected by the magnitude of the read and write pulses 5 and 3. In other words, at saturation, doubling the size of the pulses produces a negligible increase in flux density. Since the values +B max. and —B max. are negligibly affected by the size of the read and write pulses, it necessarily follows that the residual fluxes —BR and +BR are likewise essentially unaffected by the magnitude of the read and write pulses. Accordingly, for any particular transformer, when a read pulse follows a read pulse the output is proportional to the difference between +B max. and +B residual while when a read pulse follows a write pulse, the output is proportional to the difference between —B residual and +B max.

This is further illustrated in the diagram, Fig. 3, where the read pulses 5 and the write pulses 3 are shown in relation to the flux densities produced in the transformer core 1. During each of the read pulses *5a, 5b, 5c*, the flux density rises to +B max. and falls to +B residual at the end of each of these pulses. Similarly, during write pulses *3a, 3b* and *3c*, the flux density rises to —B max. and between these pulses falls to —B residual. During read pulse *5d* which follows write pulse *3c*, the flux density rises to +B max. The effect of successive read pulses such as *5a, 5b*, or *5c*, is to produce an output in coil 6 corresponding to the difference between +B max. and +B residual. The effect of a read pulse such as *5d* which follows a write pulse such as *3c* is to produce an output corresponding to the difference between —B residual and +B max. While the difference in outputs appears to be substantial in Fig. 3, difficulty has been experienced in maintaining the required difference in outputs under production conditions. In order to increase the difference in outputs, a magnetic shunt 7 is arranged around the output coil 6. The shunt has an air gap 8 which makes it essentially ineffective until the flux density in the magnetic core 1 reaches saturation. Below saturation, the permeability of the magnetic core is so much greater than the permeability of air gap 8 that the flux is confined almost entirely to the magnetic core. However, upon reaching a saturation value represented by +B residual or —B residual, the permeability of the core drops so that it is no longer very large compared to the permeability of the air gap 8 plus the magnetic shunt 7. This means that upon changes of flux density from +B residual to +B max., an appreciable amount of the flux flows through the shunt resulting in a reduction in the voltage obtained in the output coil 6 when a read pulse follows a read pulse. On the other hand, when the change in flux density is from —BR to +BR as it is during the first part of a read pulse which follows a write pulse, a negligible amount of this magnetic flux flows through the shunt 7 because during this change, the permeability of the magnetic core is very high compared to the permeability of the air gap 8.

To give a numerical example for results which can be obtained with this construction, a commercial transformer such as used in memory work having an output of 35 volts when a read pulse follows a read pulse and an output of 180 volts when a read pulse follows a write pulse can by the use of the magnetic shunt 8 have its characteristics changed so that the output voltage when a read pulse follows a read pulse will be 20 volts while the output when a read pulse follows a write pulse will not be measurably different from 180 volts. From one aspect, the magnetic shunt decreases the coupling coefficient under the conditions present when a read pulse follows a read pulse.

What is claimed as new is:

1. In a computer having series of read and write pulses, a transformer having a ring-shaped magnetic core of material capable of assuming stable remanence conditions, a winding on the core connected to receive read pulses and saturating the core in one direction during the read pulses, another winding on the core connected to receive write pulses and saturating the core in the opposite direction during the write pulses, an output winding on a part of the core remote from the other windings whereby the output is different when a read pulse follows a write pulse than when a read pulse follows a read pulse, and a magnetic shunt around the part of the core carrying the output coil, the ratio of the reluctance of the shunt to the reluctance of said part of the core being relatively smaller at saturation than at lower flux densities whereby the shunt is predominantly effective in reducing the output when a read pulse follows a read pulse which has saturated the core.

2. In a computer having series of read and write pulses, a transformer having a ring-shaped magnetic core of material capable of assuming stable remanence conditions, a winding on the core connected to receive read pulses and saturating the core in one direction during the read pulses, another winding on the core connected to receive write pulses and saturating the core in the opposite direction during the write pulses, an output winding on a part of the core remote from the other windings whereby the output is different when a read pulse follows a write pulse than when a read pulse follows a read pulse, and a magnetic shunt around the part of the core carrying the output coil, said shunt having an air gap for increasing the reluctance of the shunt at flux densities below saturation whereby the ratio of the reluctance of the shunt to the reluctance of said part of the core is relatively smaller at saturation than at lower flux densities whereby the shunt is predominantly effective in reducing the output when a read pulse follows a read pulse which has saturated the core.

3. In a computer having series of read and write pulses, a transformer having a ring-shaped magnetic core of material capable of assuming stable remanence conditions, a winding on the core connected to receive read pulses and saturating the core in one direction during the read pulses, another winding on the core connected to receive write pulses and saturating the core in the opposite direction during the write pulses, an output winding on a part of the core remote from the other windings whereby the output is different when a read pulse follows a write pulse than when a read pulse follows a read pulse, and a magnetic shunt around the part of the core carrying the output coil of such size as to be unsaturated by any pulses, the ratio of the reluctance of the shunt to the reluctance of said part of the core being relatively smaller at saturation of the core than at lower flux densities whereby the shunt is predominantly effective in reducing the output when a read pulse follows a read pulse which has saturated the core.

References Cited in the file of this patent

UNITED STATES PATENTS

| | | |
|---|---|---|
| 2,685,653 | Orr | Aug. 3, 1954 |
| 2,700,703 | Nordyke | Jan. 25, 1955 |